Dec. 24, 1929. C. H. DESAUTELS 1,740,579
TREAD ROLLING DEVICE
Filed April 6, 1925
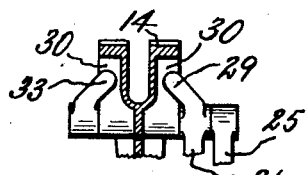
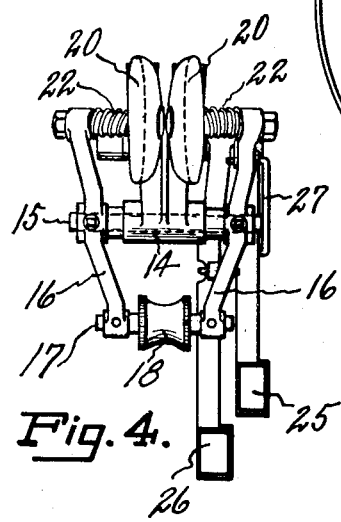
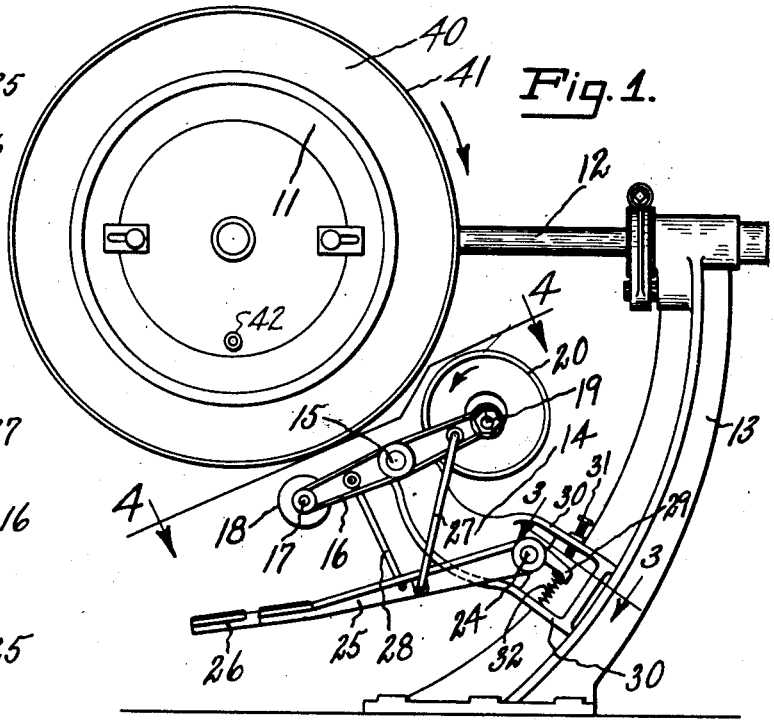
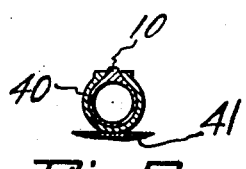
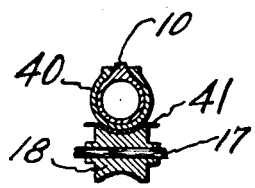
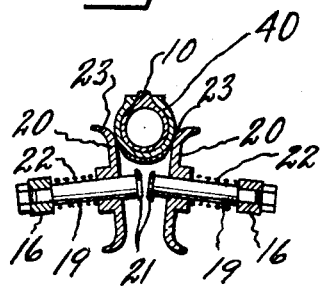
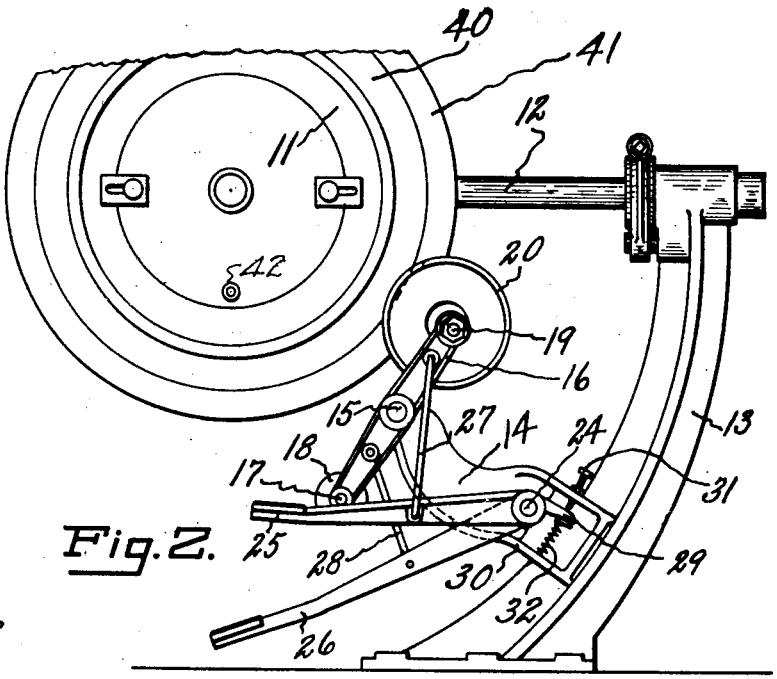
INVENTOR.
Charles H. Desautels
BY
Edward C. Taylor
ATTORNEY.

Patented Dec. 24, 1929

1,740,579

UNITED STATES PATENT OFFICE

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

TREAD-ROLLING DEVICE

Application filed April 6, 1925. Serial No. 21,042.

My invention relates to devices for rolling down upon the carcasses of automobile tires the heavy rubber strip which is to be molded into the tread portion of the tire. One object of the invention is to provide a tread rolling device which requires so little power for its rotation that it can be used on a hand operated tire building stand. Another object is to provide a tread rolling device which will roll the tread accurately, quickly, and tightly into adherence with the underlying rubberized fabric. Other objects will appear from the description and claim.

Referring to the drawings,

Fig. 1 is a side elevation of the device, with the parts in inactive position;

Fig. 2 is a similar view with the tread rollers operating on a tire;

Fig. 3 is a section on line 3—3 of Fig. 1;

Fig. 4 is a view taken on line 4—4 of Fig. 1; and

Figs. 5, 6, and 7 are detail sections illustrating successive steps in the rolling of a tread by my invention.

My improved tread rolling device has been shown as applied to a tire building stand adapted to hold a fluid pressure bag which serves as a former during the building up of the tire. It is of especial use in this connection since the bag is light, lacks inertia, and therefore makes the tread rolling operation more difficult as the operator is unaided by the momentum of a heavy core in rotating the tire during the period when the tread roller is in active operation. A high degree of efficiency in the tread roller is necessary, so that the power absorbed by the friction of the roller on the rubber will not be so great as to prevent rotation of the tire by the workman. While my improved device naturally finds its chief utility in meeting a difficult condition like this, it of course may be applied to any type of tire building unit, whether operated by power or hand.

The bag 10 is in the case shown supported on a holder 11 mounted for free rotation upon the horizontal arm 12 of a buck 13. The improved rolling device is conveniently supported upon a bracket 14 mounted on the buck. Pivoted in the bracket is a shaft 15, upon which arms 16 are fixed at about their centers. At one end of the arms they are joined by a shaft 17, upon which is journaled a roller 18 concaved to fit the center of the tread. At the other end of the arms 16 are fixed shafts 19 arranged at an angle to the axis of shaft 15. Upon these two shafts are positioned rollers 20, free to move thereon both longitudinally and rotatively. The rollers are prevented from coming off the shafts by headed portions 21 of the latter, and are backed up by springs 22 which are compressed between the rollers and the arms 16. The roll carrying shafts 19 are mounted so that their axes lie in a plane which is parallel to the axis of the tire support 11, the mounting for shafts 19 above described maintaining this parallel relation as the rolls advance toward the tire, the plane of shafts 19 approaching the axis of the tire support until the latter axis lies substantially in the plane of shafts 19 or advances through and beyond it.

Upon a shaft 24 mounted in bracket 14 are mounted treadles 25 and 26, the former being fixed on the shaft and the latter loose. Treadle 25 is connected to one of the arms 16 by a link 27 which joins the arm at a point to the right of shaft 15, as viewed in Fig. 1, while treadle 26 is connected by a similar link 28 joining the arm at a point on the other side of the pivot shaft. By this construction a pressure on treadle 25 will rock arms 16 so as to force roller 18 against the tire, while a pressure on treadle 26, as indicated in Fig. 2, will force the rollers 20 into action.

In order to keep the arms 16 in the inactive position of Fig. 1 when neither treadle is depressed, the following centralizing means may be used. The rear end of treadle 26 is provided with an inturned lip 29 (Fig. 3) which lies between the flanges 30 of a channeled section of bracket 14. Through one of these flanges passes a set screw 31, serving as a stop to prevent too great depression of the treadle. To the other flange is connected a compression spring 32, against which the lip 29 will be pressed if the treadle is raised. A collar bearing a similar lip 33 is secured to the end of shaft 24 opposite the treadles, and therefore moves with treadle 25, which is also fixed to the shaft. When one of the treadles is depressed the other will rise, due to the location of links 27 and 28 on opposite sides of the shaft 15, and the spring associated with the rising treadle will be compressed. When the treadle is released the spring will return it to a central position, the other spring preventing too great motion.

In operating the device a tire 40 may be built up on the bag 10 in any desired way. The tread rubber, as is usual, is applied in the form of a strip 41 (Fig. 5) laid by the operator tangentially around the whole circumference and stretched until its ends meet and its central portion is in contact with the tire all the way around. Treadle 25 is now depressed, the tire being meanwhile rotated by a handle 42 on the bag support. This brings roller 18 into operation as shown in Fig. 6, and presses a considerable central zone of the tread strip into firm adherence with the tire. Still rotating the tire, the operator now releases treadle 25, which is returned by the spring centering device to a central position, and depresses treadle 26, as shown in Fig. 2. The rollers 20, thus brought into contact with the tire, bear against the tread strip in the manner shown in Fig. 7, smoothing the strip with a wiping motion and pressing it against the tire carcass by the force of springs 22. Only one or two revolutions of the tire will generally be necessary for this purpose, as the action of the device is very fast.

Having thus described my invention, I claim:

A tread rolling device comprising a rotatable tire support, a pair of angularly arranged shafts converging towards the tire support and movable as a unit towards and away from the tire support, a roll having a smooth lateral tread-contacting surface slidably fitted on each of the shafts with the tread-contacting surfaces of the rolls facing each other, and means for pressing the rolls yieldably towards each other, the roll-carrying shafts being mounted with their axes lying in a plane which advances parallel to and substantially to include the axis of the tire support.

CHARLES H. DESAUTELS.